United States Patent
Zhang et al.

(10) Patent No.: US 8,401,979 B2
(45) Date of Patent: Mar. 19, 2013

(54) MULTIPLE CATEGORY LEARNING FOR TRAINING CLASSIFIERS

(75) Inventors: Cha Zhang, Sammamish, WA (US); Zhengyou Zhang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 673 days.

(21) Appl. No.: 12/618,799

(22) Filed: Nov. 16, 2009

(65) Prior Publication Data

US 2011/0119210 A1    May 19, 2011

(51) Int. Cl.
*G06F 15/18*    (2006.01)
(52) U.S. Cl. .......................................... 706/12; 706/15
(58) Field of Classification Search .................. None
See application file for complete search history.

(56) References Cited

U.S. PATENT DOCUMENTS

| | | | |
|---|---|---|---|
| 5,594,809 A * | 1/1997 | Kopec et al. ................ | 382/161 |
| 6,456,991 B1 | 9/2002 | Srinivasa et al. | |
| 7,203,669 B2 | 4/2007 | Lienhart et al. | |
| 2007/0053563 A1 | 3/2007 | Tu et al. | |
| 2008/0071711 A1 | 3/2008 | Zhang et al. | |
| 2008/0103996 A1 | 5/2008 | Forman et al. | |

OTHER PUBLICATIONS

Viola, et al., "Rapid Object Detection using a Boosted Cascade of Simple Features", Retrieved at <<http://research.microsoft.com/en-us/um/people/viola/pubs/detect/violajones_cvpr2001.pdf>> In the proceedings of Computer Vision and Pattern Recognition, 2001, vol. 1 pp. 1-9.

Tu, Zhuowen, "Probabilistic Boosting-Tree: Learning Discriminative Models for Classification, Recognition, and Clustering", Retrieved at <<http://ieeexplore.ieee.org/stamp/stamp.jsp?arnumber=01544907>> In the proceedings of the Tenth IEEE International Conference on Computer Vision, 2005, vol. 2, pp. 1589-1596.

Lienhart, et al., "A Detector Tree of Boosted Classifiers for Real-Time Object Detection and Tracking", Retrieved at <<http://www.lienhart.de/ICME2003.pdf>> In the proceedings of the 2003 International Conference on Multimedia and Expo, 2003, vol. 1, pp. 277-280.

Moore, et al., "Automatic Facial Expression Recognition Using Boosted Discriminatory Classifiers", Retrieved at <<http://personal.ee.surrey.ac.uk/Personal/R.Bowden/publications/2007/moore-amfg-07.pdf 2007, vol. 4778, pp. 71-83.

Zhang, et al., "Real-Time Multi-View Face Detection", Retrieved at <<http://ieeexplore.ieee.org/stamp/stamp.jsp?tp=&arnumber=1004147&isnumber=21655>> In the proceedings of the Fifth IEEE International Conference on Automatic Face and Gesture Recognition, 2002, pp. 6.

(Continued)

*Primary Examiner* — Alan Chen
(74) *Attorney, Agent, or Firm* — Gonzalez Saggio & Harlan LLP

(57) ABSTRACT

Described is multiple category learning to jointly train a plurality of classifiers in an iterative manner. Each training iteration associates an adaptive label with each training example, in which during the iterations, the adaptive label of any example is able to be changed by the subsequent reclassification. In this manner, any mislabeled training example is corrected by the classifiers during training. The training may use a probabilistic multiple category boosting algorithm that maintains probability data provided by the classifiers, or a winner-take-all multiple category boosting algorithm selects the adaptive label based upon the highest probability classification. The multiple category boosting training system may be coupled to a multiple instance learning mechanism to obtain the training examples. The trained classifiers may be used as weak classifiers that provide a label used to select a deep classifier for further classification, e.g., to provide a multi-view object detector.

20 Claims, 4 Drawing Sheets

OTHER PUBLICATIONS

Caruana, Rich, "Multitask Learning", Retrieved at <<http://www.cs.cornell.edu/~caruana/mlj97.pdf>> pp. 35.

Dollar, et al., "Multiple Component Learning for Object Detection", Retrieved at <<http://vision.ucsd.edu/sites/default/files/DollarEtAlECCV08mcl.pdf>> In the proceedings of the 10th European Conference on Computer Vision: Part II, 2008, pp. 211-224.

Friedman, et al., "Additive Logistic Regression: a Statistical View of Boosting", Retrieved at <<www-stat.stanford.edu/~tibs/ftp/boost.ps>> Jul. 23, 1998, pp. 1-43.

Heckerman, David, "A Tractable Inference Algorithm for Diagnosing Multiple Diseases", Retrieved at <<http://www.lirmm.fr/~koriche/W-Docs/LearningDiagnosing.pdf>> In the proceedings of the Fifth Annual Conference on Uncertainty in Artificial Intelligence, Apr. 19, 1989, pp. 1-11.

Huang, et al., "Vector Boosting for Rotation Invariant Multi-View Face Detection", Retrieved at <<http://lear.inrialpes.fr/people/triggs/student/vj/huang-iccv05.pdf>> In the proceedings of the Tenth IEEE International Conference on Computer Vision 2005, vol. 1, pp. 446-453.

Jesorsky, et al., "Robust Face Detection Using the Hausdorff Distance", Retrieved at <<http://www.bioid.com/sdk/docs/whitepapers/AVBPA01BiolD.pdf>> In the Proceedings of the Third International Conference on Audio- and Video-Based Biometric Person Authentication, 2001, pp. 90-95.

Jones, et al., "Fast Multi-View Face Detection", Retrieved at <<http://www.merl.com/papers/docs/TR2003-96.pdf>> Jul. 15, 2003, pp. 11.

Li, et al., "Statistical Learning of Multi-View Face Detection", Retrieved at <<www.cs.cmu.edu/~misc-read/talks-2003/FaceDet-ECCV2002.ps>> In the proceedings of the 7th European Conference on Computer Vision—Part IV, 2002, vol. 2353, pp. 67-81.

Shirazi, et al., "Asymmetric Boosting", Retrieved at <<http://www.machinelearning.org/proceedings/icml2007/papers/7.pdf>> In the proceedings of the 24th international conference on Machine learning, vol. 227, pp. 609-619.

Mason, et al., "Boosting Algorithms as Gradient Descent", Retrieved at <<http://www.Ismason.com/papers/NIPS00-DOOMII.pdf>> pp. 7.

Phillips, et al., "The Feret Evaluation Methodology for Face Recognition Algorithms", Retrieved at <<http://www.itl.nist.gov/iad/humanid/feret/doc/FERET_PAMI_Oct_2000.pdf>> In the proceedings of IEEE Transactions on Pattern Analysis and Machine Intelligence, Oct. 2000, vol. 22, No. 10.pp. 1090-1104.

Rowley, et al., "Neural Network-Based Face Detection", Retrieved the, Retrieved at <<http://www.informedia.cs.cmu.edu/documents/rowley-ieee.pdf>> Jan. 1998, pp. 1-28.

Schapire, et al., "Improved Boosting Algorithms using Confidence-rated Predictions", Retrieved at <<http://www.springerlink.com/content/k8134wg0824k7042/fulltext.pdf>> Dec. 1999, vol. 37, No. 3, pp. 297-336.

Schneiderman, et al., "A Statistical Model for 3d Object Detection Applied to Faces and Cars", Retrieved at <<http://www.cs.cmu.edu/afs/cs.cmu.edu/user/hws/www/CVPR00.pdf>> In the Proceedings of IEEE Conference on Computer Vision and Pattern Recognition, vol. 1, 2000, pp. 746-751.

Seemann, et al, "Multi-Aspect Detection of Articulated Objects", Retrieved at http://www.vision.ee.ethz.ch/~bleibe/papers/seemann-multiaspect-cvpr06.pdf>> In the proceedings of IEEE Computer Society Conference on Computer Vision and Pattern Recognition, Jun. 17-22, 2006, Pages pp. 1582-1588.

Sim, et al., "The CMU Pose, Illumination, and Expression Database", Retrieved at <<http://ieeexplore.ieee.org/Xplore/login.jsp?url=http%3A%2F%2Fieeexplore.ieee.org%2Fiel5%2F34%2F28007%2F01251154.pdf%3Farnumber%3D1251154&authDecision=-203>> In the IEEE Transactions on Pattern Analysis and Machine Intelligence, Dec. 2003, vol. 25, No. 12, p. 1615-1618.

Torralba, et al., "Sharing Visual Features for Multiclass and Multiview Object Detection", Retrieved at <<http://people.csail.mit.edu/torralba/publications/sharing.pdf>> In the Proceedings of IEEE Transactions on Pattern Analysis and Machine Intelligence, May 2007, vol. 29, No. 5, pp. 854-869.

Viola, et al., "Rapid Object Detection Using a Boosted Cascade of Simple Features", Retrieved at <<http://research.microsoft.com/en-us/um/people/viola/pubs/detect/violajones_cvpr2001.pdf>> In the proceedings of the 2001 IEEE Computer Society Conference on Computer Vision and Pattern Recognition, 2001, vol. 1, pp. 1-9.

Viola, et al, "Multiple Instance Boosting for Object Detection", Retrieved at <<http://books.nips.cc/papers/files/nips18/NIPS2005_0590.pdf>> Jan. 2007, pp. 8.

Wu, et al., "Fast Rotation Invariant Multi-View Face Detection Based on Real Adaboost", Retrieved at <<http://ieeexplore.ieee.org/Xplore/login.jsp?url=http%3A%2F%2Fieeexplore.ieee.org%2Fiel5%2F9123%2F28919%2F01301512.pdf&authDecision=-203>> In the proceedings of the Sixth IEEE International Conference on Automatic Face and Gesture Recognition, May 17-19, 2004.

Wu, et al., "Cluster Boosted Tree Classifier for Multi-View, Multi-Pose Object Detection", Retrieved at <<http://ieeexplore.ieee.org/Xplore/login.jsp?url=http%3A%2F%2Fieeexplore.ieee.org%2Fiel5%2F4408818%2F4408819%2F04409006.pdf%3Farnumber%3D4409006&authDecision=-203>> In the proceedings of the IEEE 11th International Conference on Computer Vision, Oct. 14-21, 2007, pp. 1-8.

* cited by examiner

MULTIPLE CATEGORY LEARNING FOR TRAINING CLASSIFIERS

BACKGROUND

Computerized object detection, including face detection, has made significant progress in recent years. For example, face detection has shown satisfactory performance for frontal face detection tasks.

Object detection becomes substantially more difficult and less accurate when objects are observed from multiple viewpoints (multi-view). In training detectors (classifiers), if example objects are labeled as positive examples but are labeled indifferently with respect to viewpoints, detectors learned through a straightforward learning algorithm do not perform accurately.

As a result, a common practice in multi-view object detection has been "divide and conquer" in which the general class of objects to be detected is first divided into subcategories. Different classifiers are then trained for different subcategories. In face detection, for instance, faces can be categorized as frontal, left/right half profile, left/right profile, zero degrees in-plane rotation, plus or minus thirty degrees in-plane rotation, and so forth. Then, a trained pose estimator may first classify a face into one of the above subcategories.

In training, each subcategory has manually labeled data for training that category's classifier. However, the manual labeling process is very labor-intensive, and is difficult to do for certain tasks such as pedestrian detection or car detection. Clustering (e.g., conventional k-means clustering) helps to an extent, but has its own problems. Labeling is also error prone; for example, the boundary between frontal and half profile faces can be very subtle, and often differs from person to person.

Thus, while pose estimation and clustering helps with multi-view object detection, misclassification caused by the pose estimator causes problems. For example, if a profile face is misclassified as frontal, it may never be detected in later classification. Misclassification also happens in training, such as when caused by mislabeling. Moreover, manual labels or clustered results are not necessarily optimal for learning an overall detector.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a plurality of classifiers is jointly trained (via multiple category boosting) with training examples in an iterative manner that associates an adaptive label with each training example after each iteration. During the iterations, the adaptive label of any example is able to be changed by the subsequent reclassification, so that, for example, as the classifiers improve during the training, each example that is mislabeled is corrected by the classifiers.

The training may use a probabilistic multiple category boosting algorithm that maintains probability data provided by the classifiers for each training example as the adaptive label. Alternatively, a winner-take-all multiple category boosting algorithm selects the adaptive label based upon the highest probability result from among the classifiers.

In one aspect, the multiple category boosting training system may be coupled to a multiple instance learning mechanism to obtain the training examples. In another aspect, the trained classifiers may be used as weak classifiers to label a set of data, with the label used to select a deep classifier for further classification, e.g., to provide a multi-view object detector.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards improving multi-view object detection through multiple category learning that operates via an adaptive labeling. In general, a set of likelihood values are maintained that describe the probability of each example belonging to each subcategory during training. These likelihood values are combined to compute the probability of the example being a positive example. A learning algorithm then maximizes the overall probability of the examples in the training data set.

Two multiple category boosting algorithms are described, including a probabilistic multiple category boosting algorithm and a winner-take-all multiple category boosting algorithm. The winner-take-all algorithm is based on the assumption that the final classification of an example will only be determined by the highest probability in all subcategories, i.e., the winner will take all.

It should be understood that any of the examples herein are non-limiting. Indeed, the two multiple category boosting algorithms that are described are only examples, and the technology described herein may be used with other algorithms. Further, subcategory classifiers for use in object detection are described as examples herein, but any type of classifier may benefit from the technology described herein. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and object detection in general.

Figure 1:
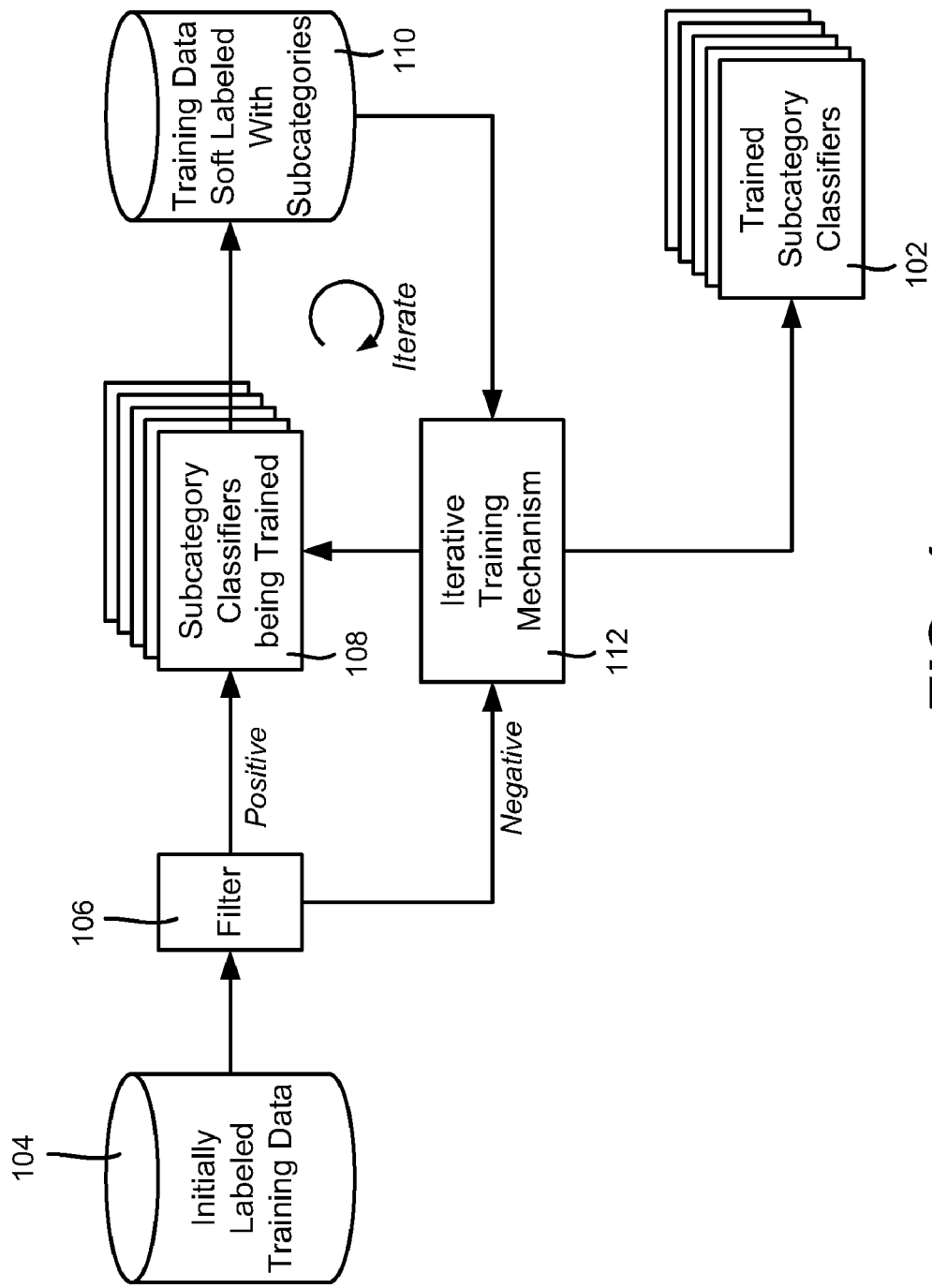
FIG. 1 is a block diagram representing example components of a multiple category boosting training system for training subcategory classifiers.

FIG. 1 is a block diagram representing an example system for training subcategory classifiers 102 via multiple category learning. Multiple category learning is more suitable for complex learning problems where it is desirable to cluster examples into different subcategories in order to improve the learning efficiency. As described below, in multiple category learning, the multiple classifiers are learned jointly.

In general, in this example labeled training data 104 (which may be provided by manual labeling, clustering, or some combination of both, for example) may be filtered via filter 106 into positive and negative examples. The subcategory classifiers "in training" 108 are initially trained using the positive, or positive and negative examples, as described below. Note that in multiple category learning, an example is classified as positive as long as one of the subcategory classifiers classifies it as positive.

Unlike other systems, the training described herein does not rely on the initial labeling, nor are the classifiers trained independently based upon that initial labeling. Rather, the training examples are fed to all classifiers in training 108 for training jointly, and each training example is only labeled with an adaptive label that can change over iterations, as described below. Thus, the labeled training data becomes relabeled with an adaptive label, as represented in FIG. 1 by the data set 110. In general, an adaptive label can change over iterations as the classifiers improve as a result of training with further data. In this manner, for example, a mislabeled example may start with the wrong subcategory classification, but as training progresses, the training example (ordinarily) becomes properly relabeled, possibly switching labels more than once.

The adaptive label may comprise a set of scores, e.g., one assigned by each classifier, as to that classifier's confidence that the label is correct. Thus, if there are five classifiers, for example, there are five scores associated with each training example. In one implementation, once the classifiers have been initially trained with the full set of data (during a burn-in phase described below), additional iterations are performed, feeding in each training example along with its associated set of scores, which are combined to help retrain the classifiers. It is feasible to have a system in which the some number less than the full set of scores (e.g., the three best scores) are kept, or a system that only keeps the scores that are above a threshold, and so on. In an alternative implementation, only the best score is kept for each training example after each iteration, that is, each positive example has a unique subcategory label at any stage of the training process, but the label may switch to a different subcategory if a higher score is achieved by a subcategory classifier.

Represented in FIG. 1 is an iterative training (algorithm) mechanism 112 that controls the iterative process, and combines the scores and/or keeps the best score. When the iterations are complete, which may be based on any suitable stop criterion such as a user-provided input number or some convergence determination (e.g., the percentage of positive examples that switch labels during an iteration is below a threshold), the trained subcategory classifiers 102 are provided for use in classifying unlabeled multi-view object data.

Thus, by maintaining an adaptive label with the training examples and iteratively feeding the adaptive-labeled examples back into the training process, the classifiers can change the label that was initially assigned to a training example. As the classifiers improve over the iterations from the benefit of seeing more positive and (if appropriate) negative examples, which are also improving in the quality of their adaptive labels, the switching of labels becomes less frequent as the training examples tend to become correctly labeled. In face detection on the order of 100,000 images, iterations on the order of hundreds are able to lower the percentage of labels that are switched to near zero percent.

Turning to the probabilistic multiple category boosting algorithm, as a general non-limiting example, consider a two-class classification problem as follows. A set of labeled examples $S=\{(x_i; z_i); i=1, \ldots, N\}$ are given for training, where $z_i=1$ for positive examples and $z_i=0$ for negative example's. In order to perform a divide and conquer operation, assume that the positive examples can be classified into $k=1, \ldots, K$ subcategories, either by manual labeling or automatic clustering. Because the manual labels or the clustering results are not directly optimized for the overall two-class classification task, it is suboptimal to simply train K classifiers separately.

As described herein, the K boosting classifiers are trained jointly. Note that in boosting, each example is classified by a linear combination of weak classifiers. Let $y_{ik}=C_k(\chi_i)=\Sigma_t \lambda_k^t c_k^t(\chi_i)$ be the weighted sum of weak classifiers for subcategory k, often referred as the score of classifier k for example $x_i$. The probability of an example x, belonging to subcategory k is given by:

$$p_{ik} = \frac{1}{1+\exp(-y_{ik})}. \quad (1)$$

Using the known Noisy OR generative model, the probability of an example $x_i$ being a positive example is:

$$p_i = 1 - \prod_k (1-p_{ik}). \quad (2)$$

The likelihood assigned to the whole training set S is thus:

$$L=\Pi p_i^{z_i}(1-p_i)^{1-z_i}. \quad (3)$$

Following the known "AnyBoost" approach, the weight on example $x_i$ for subcategory k is given as the derivative of the cost function with respect to a change in the score of the example. The derivative of the log likelihood is:

$$\frac{\partial \log L}{\partial y_{ik}} = w_{ik} = \frac{z_i - p_i}{p_i} p_{ik} \quad (4)$$

Note that for negative examples, in one implementation the weight $w_{ik}=-p_{ik}$, which is independent between different subcategories. Thus, during training, K different weights are maintained for the negative examples and updated independently. In contrast, the weights $w_{ik}$ of positive examples depend on the subcategory probability $p_{ik}$ as well as the overall probability $p_i$. If a positive example has high probability of belonging to a certain subcategory, its weights for the other subcategory classifiers will drop because it will be classified correctly at the end.

However, this is only one implementation, and negative training examples may be used in other ways. For example, a negative training example may be associated with a weight for each subcategory, that is, have a subcategory probability as well as an overall probability as with the positive training examples.

During operation, examples are classified by comparing the overall probability, $p_i$ as in Equation (2), to a final threshold th. If $p_i>$th, this is a positive example; otherwise, it is a negative example. The computation of $p_i$ uses the output of all the subcategory classifiers, $p_{ik}$, and is thus not suitable for early rejection. During training, probabilistic multiple category boosting uses a line search to find the optimal weight $\lambda_k^t$ in each subcategory classifier, which makes it slow to train and hard to deploy feature sharing.

As will be readily appreciated, winner-take-all multiple category boosting generally provides a more practical scheme, as it is faster to train, easier to share features among subcategory classifiers and more compatible with early rejection. More particularly, consider a set of training examples as $S=\{(x_i; z_i); i=1, \ldots, N\}$ $z_i=1$ for positive examples and $z_i=0$ for negative examples. Assume the positive examples can be divided into K subcategories. For each subcategory, a boosting classifier is learned. Let the score be:

$$y_{ik}^T = C_k^T(\chi_i) = \Sigma_{t=1}^T \lambda_k^t c_k^t(\chi_i)$$

where T is the number of weak classifiers in each subcategory classifier. In winner-take-all multiple category boosting, assume that the highest score of all subcategories is used to determine the fate of a given example. More specifically, let:

$$y_i^T = \max_k y_{ik}^T. \tag{5}$$

Example $x_i$ is classified as a positive example if $y_i^T$ is greater than a threshold. Otherwise, it is a negative example. The asymmetric boost loss is:

$$L^T = \sum_{i=1}^N [I(z_i = 1)\exp\{-C_1 y_i^T\} + I(z_i = 0)\exp\{C_2 y_i^T\}], \tag{6}$$

where $C_1 > 0$ and $C_2 > 0$ are the cost factor of misclassification for positive and negative examples, respectively; $I(\cdot)$ is the indicator function. According to a known statistical interpretation, minimizing this loss via boosting is equivalent to a stage-wise estimation procedure for fitting a cost-sensitive additive logistic regression model. In addition, when $C_1 = C_2 = 1$, the above loss function is an upper bound of the training error on the data set S.

However, minimizing the loss function in Equation (6) is difficult and can be very expensive in computation. Note that:

$$\exp\{C_2 y_i^T\} = \exp\{C_2 \max_k y_{ik}^T\} \leq \sum_k \exp\{C_2 y_{ik}^T\}, \tag{7}$$

Instead, a looser bound is optimized as:

$$L^T = \sum_{i=1}^N \left[ I(z_i = 1)\exp\{-C_1 y_i^T\} + I(z_i = 0)\sum_k \exp\{C_2 y_{ik}^T\} \right] \tag{8}$$

Because the subcategories of the positive examples are different from each other, it is unlikely that a negative example having a high score in one subcategory will have high score in another category. Thus, the looser bound in Equation (8) is reasonably tight.

The following two-stage algorithm may be used to minimize the asymmetric boost loss in Equation (8). With weak classifiers, at stage t, define the current run-time label of a positive example $x_i$ as:

$$l_i^t = \operatorname*{argmax}_k y_{ik}^t. \tag{9}$$

Based on these labels, the loss function may be split into K terms, $L^t = \Sigma_{k=1}^K L_k^t$ where:

$$L_k^t = \sum_{i=1}^N [I(l_i^t = k)I(z_i = 1)\exp\{-C_1 y_{ik}^t\} + I(z_i = 0)\exp\{C_2 y_{ik}^t\}]. \tag{10}$$

In the first stage of the algorithm, assume the run-time labels are fixed in searching for the best weak classifiers $c_k^{t+1}(\cdot)$ and votes $\lambda_k^{t+1}$ that minimize $\tilde{L}^{t+1} = \Sigma_{k=1}^K \tilde{L}_k^{t+1}$, where $$\tilde{L}_k^{t+1} = \sum_{i=1}^N [I(l_i^t = k)I(z_i = 1)\exp\{-C_1 y_{ik}^{t+1}\} + I(z_i = 0)\exp\{C_2 y_{ik}^{t+1}\}]. \tag{11}$$

This stage can be accomplished by performing boosting feature selection and vote computation for each subcategory independently. For instance, a confidence-rated asymmetric boosting algorithm (described below) may be used for such purpose. Because the asymmetric boost loss is convex, it is guaranteed that this boosting step will reduce the loss function, that is:

$$\tilde{L}_k^{t+1} \leq L_k^t, \text{ and } \tilde{L}^{t+1} \leq L^t.$$

In the second stage, the algorithm updates the run-time labels, namely:

$$l_i^{t+1} = \operatorname*{argmax}_k y_{ik}^{t+1}. \tag{12}$$

The loss function is updated as:

$$L^{t+1} = \Sigma_{k=1}^K L_k^{t+1} \text{ where}$$

$$L_k^{t+1} = \sum_{i=1}^N [I(l_i^{t+1} = k)I(z_i = 1)\exp\{-C_1 y_{ik}^{t+1}\} + I(z_i = 0)\exp\{C_2 y_{ik}^{t+1}\}]. \tag{13}$$

It is straightforward to see that $L^{t+1} \leq \tilde{L}^{t+1}$, hence both stages of the algorithm reduce the loss function. Given that the asymmetric boost loss in Equation (8) is non-negative, the algorithm is guaranteed to converge to a (local) minimum.

The run-time labels in winner-take-all multiple category boosting can be updated after each weak classifier is added. In practice, it may be beneficial to update them less frequently to avoid dramatic label oscillation. The following table sets forth the stages of winner-take-all multiple category boosting:

| Input |
| --- |
| Training examples $\{(x_i, z_i, s_i)\}$, $i = 1, \ldots, N$ where $z_i \in \{0, 1\}$ for negative and positive examples. $s_i \in \{1, \ldots, K\}$ is the initial subcategory ID. For positive examples, $s_i$ can be manually assigned or obtained through clustering. For negative examples, $s_i$ can be randomly assigned (it will be ignored in Winner-Take-All Multiple Category Boosting). T is the total number of weak classifiers, which can be set through cross- |

-continued validation.
P is the label switching frequency.

Initialize

Assign initial scores for all examples $y_{ik}^0$, where k = 1, ..., K is the index of
the subcategory classifier.
Assign run-time label $1_i^0 = s_i$
Winner-Take-All Multiple Category Boosting Learning
For t = 1, ..., T:
According to the current run-time labels, perform confidence-rated asymmetric boosting for each subcategory (Equation (11) and the confidence-rated asymmetric boosting algorithm (described below)).
If mod (t, P) = 0, perform label switching for the positive examples ($z_i = 1$) according to Equation (12).

Output

A set of K boosting classifiers $C_k^T(x_i) = \Sigma_{t=1}^T \lambda_k^t c_k^t(x_i)$.

In the above table, the run-time-labels are updated every P weak classifiers are learned for each subcategory. A typical value of P is 32. Moreover, by choosing a large P for the first round, classifiers may be given a "burn in" period where they learn the general property of the subcategory. In one implementation, label switching starts after 96 weak classifiers are learned for each subcategory.

Updating the run-time labels allows the positive example clusters to be re-formed during training, which can improve the final classification performance. Note that manual labels may be used to assign the initial subcategories, and/or a known splitting criteria and clustering method may be used. Regardless, winner-take-all multiple category boosting helps in resolving the subcategory misclassification issues and improves the overall classification performance.

The following describes a confidence-rated prediction algorithm for asymmetric boosting. Such a method can be used for learning multiple classifiers simultaneously with shared weak classifiers.

Consider a set of training examples as $S = \{(x_i; z_i); i=1, \ldots, N\}$, where $z_i=1$ for positive examples and $z_i=0$ for negative examples. Let the score of example $x_i$ be $y_i^T = C^T(\chi_i) = \Sigma_{t=1}^T \lambda^t c^t(\chi_i)$ where T is the number of weak classifiers. Assume for now that a single category classifier is learned. The asymmetric loss function is:

$$L^T = \sum_{i=1}^{N}[I(z_i = 1)\exp\{-C_1 y_i^T\} + I(z_i = 0)\exp\{C_2 y_i^T\}]. \quad (14)$$

Given t weak classifiers selected, a new feature $f^{t+1}$ and its J partitions $u_1; u_2, \ldots, u_J$, accumulate the weighted fraction of examples in each partition:

$$W_{+j} = \Sigma I(f^{t+1}(\chi_i) \in u_j) I(z_i=1) \exp\{-C_1 y_i^t\}$$

$$W_{-j} = \Sigma I(f^{t+1}(\chi_i) \in u_j) I(z_i=0) \exp\{C_2 y_i^t\} \quad (15)$$

Let the vote in partition $u_j$ be $c_j$. In confidence-rated prediction, the score is computed as $y_i^{t+1} = \Sigma_{\tau=1}^{t+1} c^\tau(\chi_i); c^{t+1}(\chi_i) = c_j$, if $f^{t+1}(\chi_i) \in u_j$. The loss function of partition $u_j$ at t+1 is:

$$L_j^{t+1} = W_{+j} \exp\{-C_1 c_j\} + W_{-j} \exp\{C_2 c_j\}. \quad (16)$$

It can be verified that when $$c_j = \frac{1}{C_1 + C_2} \ln\left(\frac{C_1 W_{+j}}{C_2 W_{-j}}\right), \quad (17)$$

$L_j^{t+1}$ has its minimum value as:

$$L_j^{t+1} = \gamma W_{+j}^{\frac{C_2}{C_1+C_2}} W_{-j}^{\frac{C_1}{C_1+C_2}} \quad (18)$$

where $$\gamma = \left(\frac{C_2}{C_1}\right)^{\frac{C_1}{C_1+C_2}} + \left(\frac{C_1}{C_2}\right)^{\frac{C_2}{C_1+C_2}}.$$

In practice, the search is through all possible features and partitions to find the weak classifier that minimizes $$L^{t+1} = \sum_j L_j^{t+1} = \gamma \sum_j W_{+j}^{\frac{C_2}{C_1+C_2}} W_{-j}^{\frac{C_1}{C_1+C_2}}, \quad (19)$$

which can be implemented very efficiently.

The above method may further be extended to multiple category boosting with shared features. Given a feature, each subcategory classifier can find its corresponding partition and votes in order to minimize the joint loss of all K subcategory classifiers:

$$L^{t+1} = \sum_{k=1}^{K} \sum_j L_{kj}^{t+1}, \quad (20)$$

where $L_{kj}^{t+1}$ is the loss for classifier k, partition j, computed by Equation (18). The partition of the feature can also be shared by all the subcategory classifiers. The best feature is the one that minimizes the joint loss of Equation (20).

Figure 2:
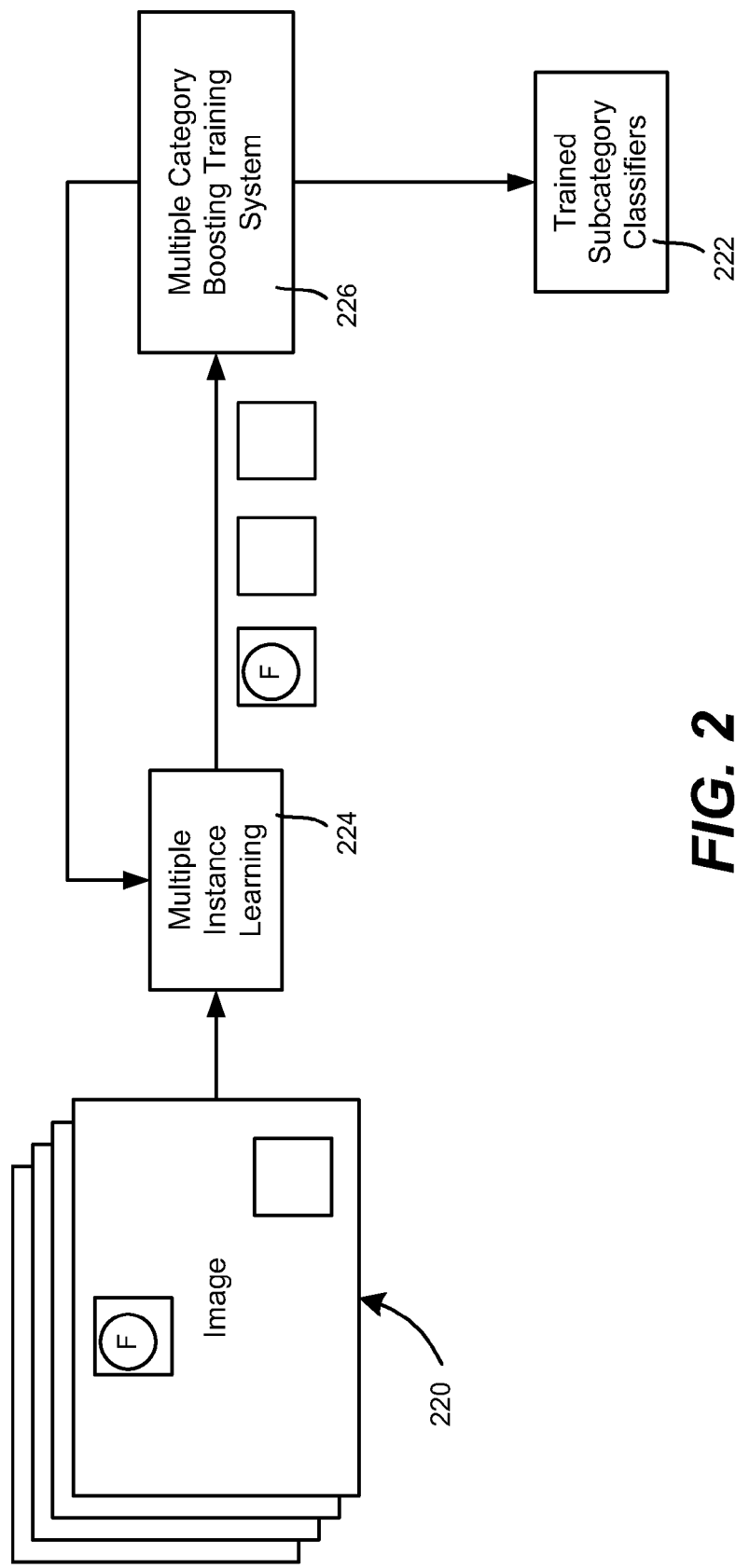
FIG. 2 is a block diagram representing an example of how multiple instance learning may be combined with a multiple category boosting training system for training subcategory classifiers.

Turning to another aspect generally represented in FIG. 2, the above-described multiple category boosting may be combined with multiple instance learning. By way of example, consider an image 220 that contains a face, in which the image is divided into rectangles. However, the rectangular portion that bounds the face is not known. Thus, there is essentially one positive rectangle, and the rest are negative.

During training, not only are the classifiers 222 trained, but the rectangle that contains the face needs to be determined. Combining multiple instance learning 222 with a multiple category boosting training system 224 as described above allows this to occur. Note that this is also useful when labels are imperfect and/or noisy, labeling is difficult (e.g., the eyes within a face are not aligned well in some of the rectangles but are aligned well in at least one), and so forth.

In these examples, multiple instance learning can be used to send a series of rectangles into the multiple category boosting training system as positive examples that contain some or all of the face within some portion of the rectangle, and negative examples that contain no part of the face. Along with tracking the adaptive label with each example, the position/identity of each rectangle corresponding to that example is tracked so that the rectangle that best represents the face may be determined. Thus, in a five subcategory classifier, each rectangle may have five scores per iteration, which may each be kept as probabilities, or have the best score selected, and so forth. The classifiers improve as multiple images are processed in this same manner.

Figure 3:
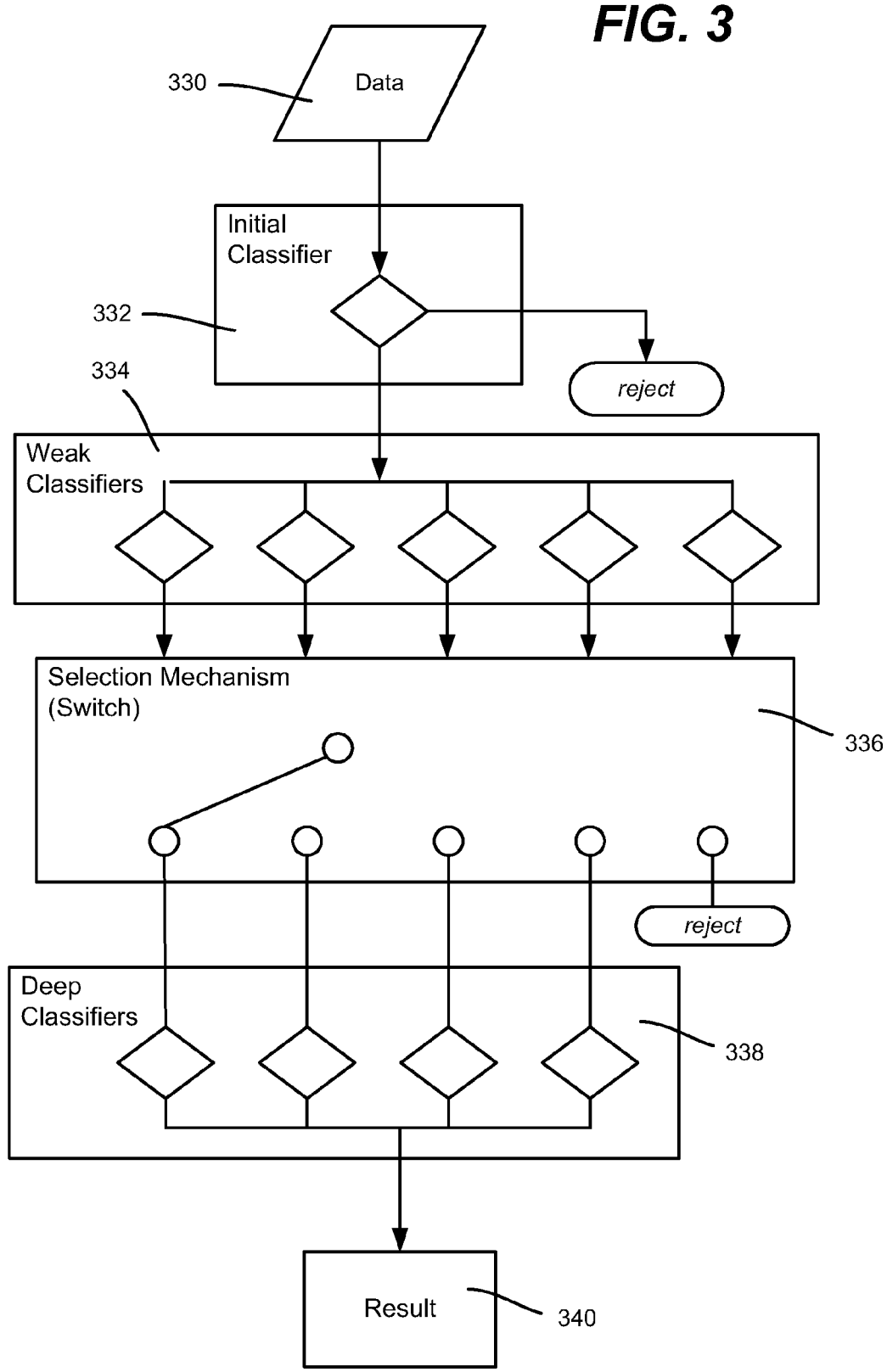
FIG. 3 is a block diagram representing how subcategory (weak) classifiers may be used to label data for selection of a further (deep) classifier.

Turning to operation of the subcategory classifiers, FIG. 3 shows one example of how trained classifiers may be efficiently used to classify some piece of data 330, such as an image that may contain a face. An initial classifier 332 may be present, such as to reject or allow further classification of the data based on a simple classification, e.g., if the initial classifier determines (e.g., below a threshold) that the image is not a face, or likely is a face.

If the data passes the initial classifier's evaluation (if one exists), then the data may be fed to a set of weak classifiers 334 trained as described above to apply a label (e.g., based on the best score) to the data. Based on the selection of the best score/label by a selection mechanism 336, essentially a switch, only one of a set of deep classifiers 338 will perform a final classification to obtain a classification result 240. Note that in this example, the selection mechanism 332 is able to reject the data 330, such as no weak classifier has a sufficiently high score, e.g., because the initial classifier (which typically uses less features) got it wrong instead of rejecting the data.

By way of example, consider that the weak classifiers 334 each consider 96 features in classifying the data into a set of scores, one score for each subcategory. Further, the set of deep classifiers 338 may consider 600 or so features in their classification. It is feasible to give the data to the deep classifiers 338 directly, however this requires that each deep classifier operate on the data, which is computationally expensive. Instead, the weak classifiers basically operate to label the data in order to select which deep classifier to use in obtaining a final classification result.

Exemplary Operating Environment

Figure 4:
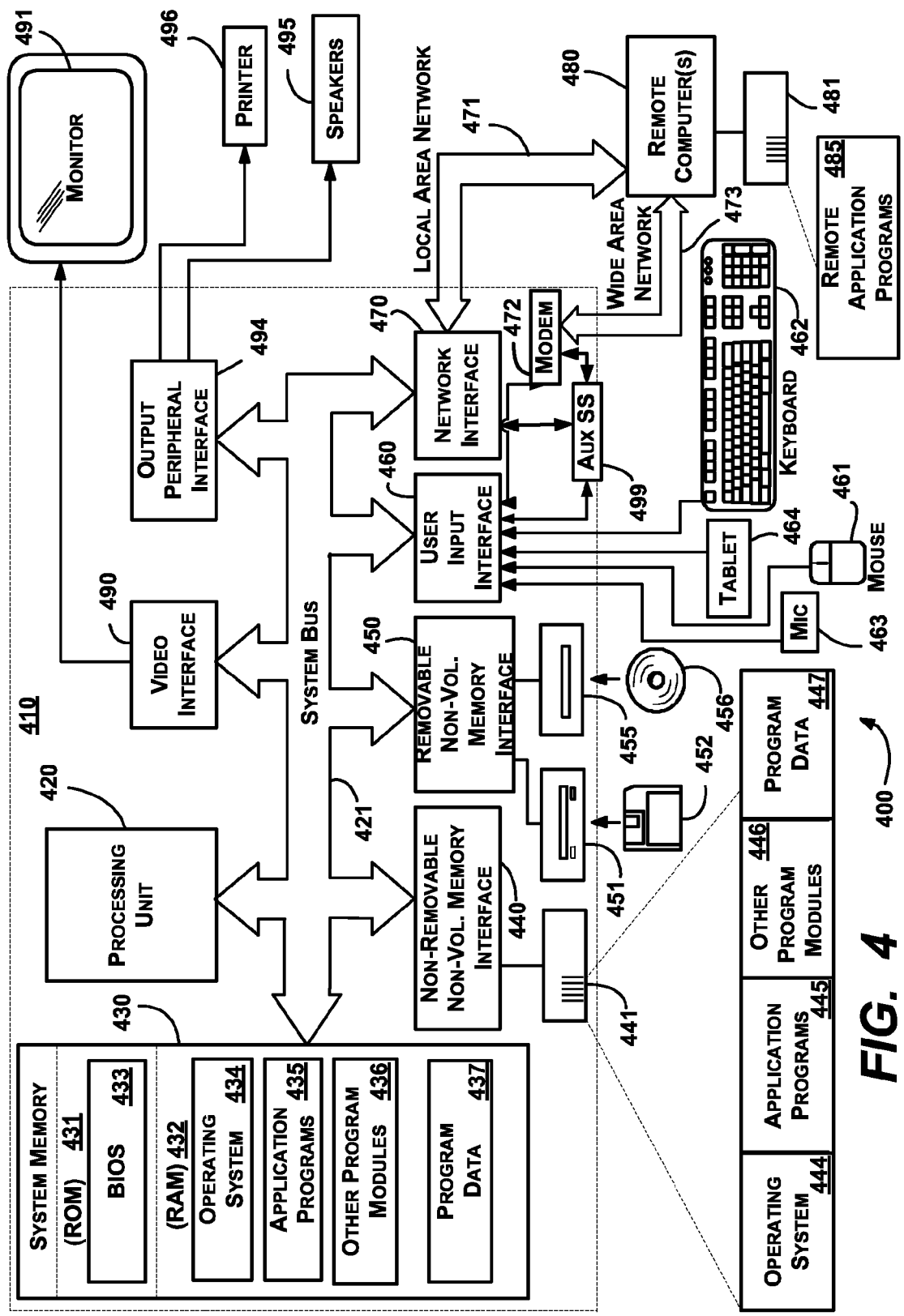
FIG. 4 shows an illustrative example of a computing environment into which various aspects of the present invention may be incorporated.

FIG. 4 illustrates an example of a suitable computing and networking environment 400 on which the examples of FIGS. 1-3 may be implemented. The computing system environment 400 is only one example of a suitable computing environment and is not intended to suggest any limitation as to the scope of use or functionality of the invention. Neither should the computing environment 400 be interpreted as having any dependency or requirement relating to any one or combination of components illustrated in the exemplary operating environment 400.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 4, an exemplary system for implementing various aspects of the invention may include a general purpose computing device in the form of a computer 410. Components of the computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 410 typically includes a variety of computer-readable media. Computer-readable media can be any available media that can be accessed by the computer 410 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 410. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436 and program data 437.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media, described above and illustrated in FIG. 4, provide storage of computer-readable instructions, data structures, program modules and other data for the computer 410. In FIG. 4, for example, hard disk drive 441 is illustrated as storing operating system 444, application programs 445, other program modules 446 and program data 447. Note that these components can either be the same as or different from operating system 434, application programs 435, other program modules 436, and program data 437. Operating system 444, application programs 445, other program modules 446, and program data 447 are given different numbers herein to illustrate that, at a minimum, they are different copies. A user may enter commands and information into the computer 410 through input devices such as a tablet, or electronic digitizer, 464, a microphone 463, a keyboard 462 and pointing device 461, commonly referred to as mouse, trackball or touch pad. Other input devices not shown in FIG. 4 may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. The monitor 491 may also be integrated with a touch-screen panel or the like. Note that the monitor and/or touch screen panel can be physically coupled to a housing in which the computing device 410 is incorporated, such as in a tablet-type personal computer. In addition, computers such as the computing device 410 may also include other peripheral output devices such as speakers 495 and printer 496, which may be connected through an output peripheral interface 494 or the like.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 4. The logical connections depicted in FIG. 4 include one or more local area networks (LAN) 471 and one or more wide area networks (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460 or other appropriate mechanism. A wireless networking component 474 such as comprising an interface and antenna may be coupled through a suitable device such as an access point or peer computer to a WAN or LAN. In a networked environment, program modules depicted relative to the computer 410, or portions thereof, may be stored in the remote memory storage device. By way of example, and not limitation, FIG. 4 illustrates remote application programs 485 as residing on memory device 481. It may be appreciated that the network connections shown are exemplary and other means of establishing a communications link between the computers may be used.

An auxiliary subsystem 499 (e.g., for auxiliary display of content) may be connected via the user interface 460 to allow data such as program content, system status and event notifications to be provided to the user, even if the main portions of the computer system are in a low power state. The auxiliary subsystem 499 may be connected to the modem 472 and/or network interface 470 to allow communication between these systems while the main processing unit 420 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method performed on at least one processor, comprising: jointly training a plurality of classifiers with training examples, including classifying each training example to determine an adaptive label for that training example, in which the adaptive label is able to be changed by a subsequent reclassification iteration; associating each training example with its respective adaptive label; and retraining the classifiers by iteratively feeding the training examples back into the classifiers along with information corresponding to their adaptive labels for a number of iterations.

2. The method of claim 1 wherein classifying each training example to determine an adaptive label comprises obtaining a score from each of the classifiers, and wherein associating each training example with its respective adaptive label comprises maintaining the scores.

3. The method of claim 2 wherein retraining the classifiers by iteratively feeding the training examples back into the classifiers along with information corresponding to their adaptive labels comprises combining the scores.

4. The method of claim 1 wherein classifying each training example to determine an adaptive label comprises obtaining a score from each of the classifiers, and wherein associating each training example with its respective adaptive label comprises selecting and maintaining an adaptive label based upon a comparison of the scores.

5. The method of claim 1 further comprising, obtaining the training examples from a multiple instance learning mechanism.

6. The method of claim 1 further comprising, after the iterative retraining, using the classifiers as subcategory classifiers in a multiple view object detection system.

7. The method of claim 6 further comprising, after the iterative retraining, using the classifiers as weak classifiers to obtain a label that is used for selecting a deep classifier from among a plurality of deep classifiers.

8. In a computing environment, a system, comprising, a plurality of weak classifiers jointly trained by multiple category learning, each weak classifier outputting a score with respect to a set of data being classified; and a selection mechanism that selects a deep classifier based upon the score to classify the data into a classification result.

9. The system of claim 8 wherein the plurality of weak classifiers are part of a multiple view object detector.

10. The system of claim 8 further comprising an iterative training mechanism that jointly trains the plurality of weak classifiers, including by classifying training examples to determine an adaptive label for each training example, in which the adaptive label is able to be changed during each subsequent reclassification iteration.

11. The system of claim 10 wherein the iterative training mechanism includes a probabilistic multiple category learning algorithm that maintains probability information as part of the adaptive label.

12. The system of claim 10 wherein the iterative training mechanism includes a winner-take-all multiple category learning algorithm that maintains the adaptive label based upon a best score from among the classifiers being trained.

13. The system of claim 10 further comprising, a multiple instance learning mechanism coupled to the iterative training mechanism.

14. The system of claim 10 wherein the iterative training mechanism separates positive training examples from negative training examples, and wherein each negative training example is used in training all of the classifiers.

15. The system of claim 10 wherein the iterative training mechanism determines an adaptive label for each positive training example and determines an adaptive label for each negative training example.

16. One or more computer-readable storage media having computer-executable instructions, which when executed perform steps, comprising: (a) using a plurality of classifiers to classify each training example of a set of training examples to determine an adaptive label for that training example, in which the adaptive label is able to be changed by a subsequent reclassification iteration; (b) associating each training example with its respective adaptive label; and (c) returning to step (a) until a stop criterion is met.

17. The one or more computer-readable storage media of claim 16 wherein classifying each training example comprises obtaining a score from each of the plurality of classifiers, and wherein associating each training example with its respective adaptive label comprises maintaining the scores.

18. The one or more computer-readable storage media of claim 16 wherein classifying each training example to determine an adaptive label comprises obtaining a score from each of the plurality of classifiers, and wherein associating each training example with its respective adaptive label comprises selecting and maintaining an adaptive label based upon a comparison of the scores.

19. The one or more computer-readable storage media of claim 16 having further computer-executable instructions, comprising receiving the training examples from a multiple instance learning mechanism.

20. The one or more computer-readable storage media of claim 16 having further computer-executable instructions, comprising, after step (c), using at least one of the plurality of classifiers as weak classifiers to obtain a label that is used for selecting a deep classifier from among a plurality of deep classifiers.

* * * * *